Jan. 5, 1937.   J. E. CARLIN   2,066,610
FARM MACHINERY
Filed Jan. 3, 1935
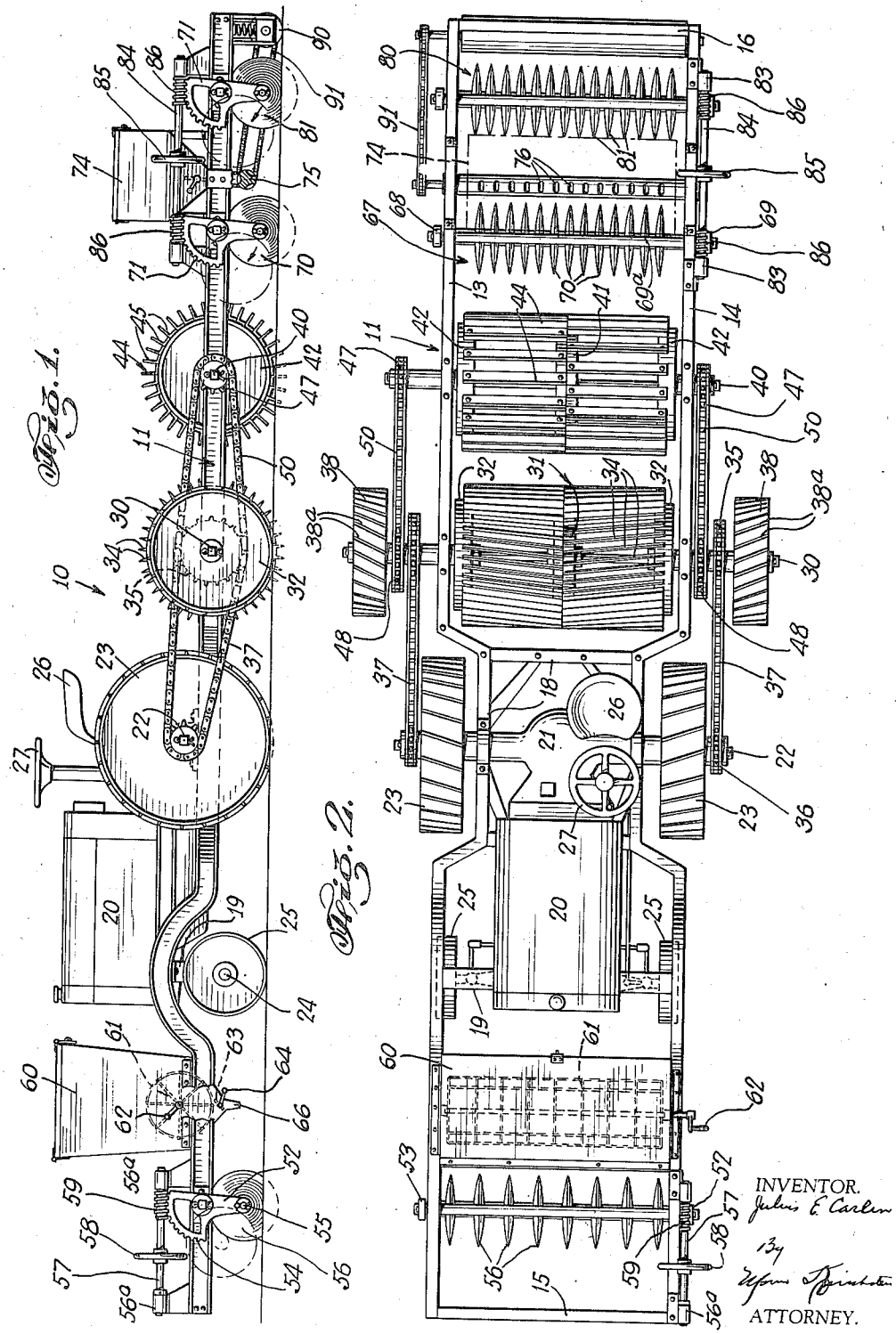
INVENTOR.
Julius E. Carlin
By
ATTORNEY.

Patented Jan. 5, 1937

2,066,610

UNITED STATES PATENT OFFICE 2,066,610

FARM MACHINERY

Julius E. Carlin, Bronx, N. Y.

Application January 3, 1935, Serial No. 212

7 Claims. (Cl. 97—40)

This invention relates to farm machinery.

An object of this invention is to provide a machine of the character described, comprising a vehicle having mechanism for harrowing the earth, mechanism for applying fertilizer to the harrowed earth, mechanism for digging and shovelling the earth to which fertilizer has been applied, mechanism for harrowing furrows in the dug and shovelled earth, mechanism for applying seed within said furrows, mechanism for covering the seeded furrows and mechanism for rolling the earth after the seed has been covered, the construction being such that substantially all of the mechanism is mounted on the frame of the vehicle.

A further object of this invention is to provide in a machine of the character described, means for lifting the harrows on the machine to inoperative position.

A still further object of this invention is to provide in a machine of the character described, digging and plowing devices which serve as traction means to aid in the movement of the machine and by their weight aid in the digging and plowing operation.

Still another object of this invention is to provide a compact and rugged machine of the character described, which shall be relatively inexpensive to manufacture and withal practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a side elevational view of a machine embodying the invention; and Fig. 2 is a top plan view of my improved machine.

Referring now in detail to the drawing, 10 designates an automotive vehicle or machine embodying the invention and comprises a frame 11 having side portions 13 and 14, a front end 15 and a rear end 16. The frame is provided with a central portion 18 and a cross beam 19 supporting a power engine 20 of any suitable construction, and differential housing 21. The frame extends forwardly and rearwardly of the engine, as will be described hereinafter in detail. Received within the differential housing 21 is a preferably square-shaped shaft or axle 22 on which are mounted cleated traction wheels 23. Adjacent the front of the engine there is suitably mounted on the frame, an axle 24 for the front wheels 25, the machine being steered through suitable mechanism acting on said axle 24.

On the central frame portion 18 is provided the driver's seat 26, the steering wheel 27 and other usual controlling mechanism. Mounted on the frame 11, rearwardly of the engine, is an axle 30 preferably of square shape and fixed on said axle and disposed within the frame is a central wheel 31 and side wheels 32. The wheels 31 and 32 are substantially similar; and the central wheel is interconnected to the side wheels by a plurality of parallel wedge-shaped members 34 preferably inclined to the longitudinal axis of the wheels. The members 34 which interconnect the central wheel 31 with one of the side wheels 32 are preferably inclined in a direction opposite to that of the members 34 which interconnect said central wheel with said other side wheel 32. The members 34 which interconnect the central wheel with one outer wheel are preferably staggered with respect to the members 34 which interconnect said central wheel with the other outer wheel.

Mounted on the axle 30 and disposed on the outside of the frame are a pair of sprocket wheels 35 interconnected with sprocket wheels 36 on the axle 21 by chains 37. The wheels 35 are preferably larger than the wheels 36. There is further fixed to the outer ends of the axle 30 a pair of tractor wheels 38 having inclined wedge-shaped ridges or cleats 38a. When the vehicle moves the members 34 cut transverse channels into the earth.

There is also mounted on the frame 11, rearwardly of axle 30, an axle 40 preferably of square shape and mounted on said axle 40 is a central wheel 41 and side wheels 42. Interconnecting the central wheel 41 with the side wheels 42 are angle shaped cleats or digging members 44, preferably in staggered relation and longitudinally disposed. The angle-shaped members 44 have radially extending walls 45 adapted to dig into the earth, as will be more fully explained hereinafter. The axle 40 extends beyond the frame portions 13 and 14 and on said extending portions are mounted sprocket wheels 47 interconnected to sprocket wheels 48 on the axle 30 by sprocket chains 50. The sprocket wheels 47 are preferably smaller than the sprocket wheels 48 so that the axle 40 will rotate faster than the axle 30. Wheels 41 and 42 may be substantially of same diameter as wheels 31, 32.

It will now be understood that as the vehicle operates, the members 34 will dig into the earth and the members 44 will not only dig into the earth but will also shovel the earth rearwardly since the axle 40 rotates faster than the axle 30. The earth is thus not only dug but shovelled and is therefore well plowed. At the same time it is seen that the members 34 and 44 also serve to aid in the traction of the vehicle. If desired, the axle 30 and 40 may be driven directly from the shaft 22, thus making the drums carrying the members 34 and 44 the sole traction means for the vehicle.

The weight of the frame 11 and the machine as a whole, helps to press the cutters 34 and 44 into the earth.

To prepare the earth for the cutting operation, the frame 11, as shown in the drawing, extends forwardly of the engine and mounted on the forward part of the frame are aligned, pivoted members 52 and 53, the member 52 being formed with a segmental worm wheel portion 54. Mounted on the lower ends of the pivoted members 52 is a shaft 55 on which there are mounted a plurality of spaced, double convex harrows 56. Rotatably mounted on aligned bearings 56a on one side of the frame is a shaft 57 provided with a turning hand wheel 58 and a worm 59 meshing with the segment 54 to cause pivotal movement of the members 52, 53 for raising the harrows to inoperative position, as shown in dot-dash lines in the drawing.

There is also mounted on the forward part of the frame and rearwardly of the harrows 56 a hopper 60 for fertilizer. An agitating device 61 mounted within the hopper and actuated by a crank handle 62 serves to break up the fertilizer. A valve 63 at the bottom end of the hopper, controlled by a handle 64, opens the nozzles 66 to permit fertilizer to fall to the ground. The ground is thus harrowed and fertilizer is applied to the harrowed earth, before the digging and shovelling operations of the members 34 and 44.

After the ground is dug and well plowed, the same may be further harrowed into furrows by harrow mechanism 67 located rearwardly of the axle 40. The mechanism 67 may comprise members 68 and 69 pivoted to opposite sides of the frame and supporting a shaft 69a on which the double convex harrows 70 are located. The member 69 may be provided with a segmental worm wheel portion 71. The harrows 70 are preferably staggered with respect to the harrows 56 at the front of the machine.

Located on the frame rearwardly of the harrow mechanism 67 is a hopper 74 for seed. The hopper may be provided with a rotating valve 75 having spaced pockets 76 aligned with the harrows 70, whereby seed may be dropped into the furrows formed by harrows 70.

For covering the seed in the furrows there may be located rearwardly of the seeding mechanism, a harrow mechanism 80. Said harrow mechanism 80 is similar to the mechanism 67 except that the harrows 81 of the mechanism 80 are staggered with respect to the harrows 70 of the mechanism 67. With such construction, after the seed has fallen into the furrows made by the harrows 70 the seeds are covered by the harrowing operation of the mechanism 80. There is mounted on bearings 83 on the frame portion 14 a shaft 84 having a turning hand wheel 85 and provided with worms 86 for operating the segmental worm wheels of the mechanisms 67 and 80 to lift the harrows out of the earth when not in use.

There is further mounted on the rear end of the frame 12 a spring pressed roller 90 adapted to press down the earth and smooth the same. The roller 90 may be connected by chain 91 to the valve member 75 of the seeding mechanism whereby said valve member is rotated due to rotation of the roller when the latter contacts the earth.

The operation of the machine will now be understood. The earth is first harrowed by the harrows 56. Fertilizer is then dropped into the harrowed earth. Thereafter the earth is well dug by the members 34 and then shovelled and plowed up by the members 44. Furrows are then formed by the harrows 70 for receiving seed from the pockets in the valve member 75. The seeded earth is then covered up by the harrows 81 and the earth is then rolled smooth by the roller 90. It will be noted that all of the mechanism is mounted on the frame 11 of the vehicle to prevent lateral motion and looseness.

When the harrows are lifted, the valves on the fertilizer and on the seeder may be closed so as not to deposit fertilizer or seeds when the harrow mechanisms are not in operation. When the harrows are lifted, turning of the vehicle is facilitated.

After the earth has been harrowed by the harrows 56 and cut and shovelled by the members 34 and 44 all grass and weeds or other growth will be cut, dug and covered. Since the harrows 56 and the cutters 34 present wedge-shaped cutting portions for cutting the earth, the earth is spread apart where cut without unduly compressing the earth beneath the cutters.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawing is to be interpreted as illustrative and not in a limiting sense.

Having thus described my invention, I claim as new and desire to secure by Letters Patent:

1. In combination with a tractor, a frame on said tractor, an axle mounted on said frame and extending beyond the sides of the frame, a central wheel on said axle disposed within said frame, a pair of outer wheels on said axle disposed within the sides of the frame and adjacent thereto, a plurality of wedge-shaped members interconnecting the central wheel with the outer wheels, tractor wheels on the portions of the axle extending beyond the sides of the frame, a second axle on said frame parallel to the first axle and extending beyond the sides of the frame, a central wheel on said second axle disposed within said frame, a pair of outer wheels on said second axle disposed within the sides of the frame and adjacent thereto, members interconnecting the last mentioned central wheel with the last mentioned outer wheels, sprocket wheels on said axles and a sprocket chain interconnecting said sprocket wheels, said sprocket wheels being of different diameters whereby one of said axles rotates faster than the other of said axles.

2. In combination, a tractor having traction wheels adapted to propel said tractor in a forward direction, a rotary member on said tractor having means for digging ridges into the earth in a direction transverse to that of the travel of said tractor, said digging means being rendered effective by the weight of said tractor and rotary member, a second rotary member on said tractor having means rendered effective by the weight of said tractor and said second rotary member for digging ridges into the earth in a direction transverse of the direction of travel of said tractor, including means for mixing the dug earth, said first rotary member and said second rotary member being adapted to travel in a forward direction to aid in the traction of said tractor.

3. In combination, a tractor having traction wheels adapted to propel said tractor in a forward direction, a rotary member on said tractor having means for digging ridges into the earth in a direction transverse to that of the travel of said tractor, said digging means being rendered effective by the weight of said tractor and rotary member, a second rotary member on said tractor having means rendered effective by the weight of said tractor and said second rotary member for digging ridges into the earth in a direction transverse of the direction of travel of said tractor, including means for mixing the dug earth, said first rotary member and said second rotary member being adapted to travel in a forward direction to aid in the traction of said tractor, and means for rotating one of said rotary members at a greater speed than the other of said rotary members.

4. In combination, a tractor, means on said tractor for plowing the earth with furrows disposed in a transverse direction to the direction of travel of said tractor, said plowing means comprising an axle, a central wheel and a pair of outer wheels mounted on said axle for rotation therewith, a plurality of wedge-shaped members interconnecting the central wheel with the outer wheels, means for breaking up and mixing the plowed earth comprising a second axle, parallel to said first axle, a central wheel and a pair of outer wheels mounted on said second axle for rotation therewith, members interconnecting the last mentioned central wheel with the last mentioned outer wheels, and means whereby one of said axles is rotated faster than the other of said axles, means for furrowing the broken up and mixed earth, said furrows being disposed in the same direction as the travel of said tractor, means for fertilizing said furrowed earth, means for seeding said furrowed earth, means for covering up said seeded earth, and means for rolling said covered up seeded earth.

5. In combination, a tractor, a frame attached thereto, a pair of axles mounted on said frame, drums mounted on said axles for rotation therewith, each of said drums comprising a central wheel and a pair of outer wheels, and a plurality of earth digging members interconnecting the central wheel with the outer wheels, and means for rotating one of said axles faster than the other of said axles, said drums being adapted to be used as the sole traction means for said tractor.

6. In combination with a tractor, a frame on said tractor, an axle mounted on said frame and extending beyond the sides of the frame, a central wheel on said axle disposed within said frame, a pair of outer wheels on said axle disposed within the sides of the frame and adjacent thereto, a plurality of wedge-shaped sharpened members interconnecting the central wheel with one of the outer wheels, a plurality of wedge-shaped members interconnecting the central wheel with the other outer wheel, said first mentioned wedge-shaped members being disposed at an angle to said second mentioned wedge-shaped members, and tractor wheels on the portions of the axle extending beyond the sides of the frame.

7. In a farm machine of the character described, a vehicle, a frame on said vehicle, a plurality of rectangular axles mounted on said frame for rotation therein and extending beyond the sides of said frame, a drum mounted on each of said axles and disposed between the sides of said frame, a plurality of wedge-shaped, sharpened members contiguously disposed on one of said drums, a plurality of sharpened members on another of said drums, traction wheels mounted on portions of the axles extending beyond the frame, said drums and said traction wheels being adapted to rotate with said axles and in said frames.

JULIUS E. CARLIN.